Oct. 9, 1973

METHOD AND APPARATUS FOR PURIFYING METAL

Filed Aug. 18, 1971

INVENTORS
BRIAN C. COAD
RAYMOND B. PALMER
BY Fitch, Even, Tabin & Luedeka
ATTORNEYS

United States Patent Office 3,764,297
Patented Oct. 9, 1973

3,764,297
METHOD AND APPARATUS FOR PURIFYING METAL
Brian C. Coad, Oakland, and Raymond B. Palmer, Berkeley, Calif., assignors to Airco, Inc.
Filed Aug. 18, 1971, Ser. No. 172,647
Int. Cl. C21c 5/52; C22d 7/00; H05b 7/18
U.S. Cl. 75—10     7 Claims

ABSTRACT OF THE DISCLOSURE

A method and apparatus are described for purifying metal. Solid metal is melted in a first vacuum region by means of an electric arc. The metal thus melted is collected in skulled containing means and passed from the first vacuum region to and through a second vacuum region having a substantially lower pressure than the first vacuum region. The molten metal is heated in the second vacuum region by means of electron beams to purify the metal. The metal is then solidified in a third vacuum region.

---

This invention relates to the vacuum melting, purification and casting of metals and, more particularly, to a method and apparatus for purifying metal on a continuous basis.

It is generally known that the processing of steel under vacuum conditions can materially enhance various of its properties. For example, the avoidance of oxide inclusions resulting from vacuum processing, such as vacuum induction melting and vacuum arc remelting, results in a cleaner alloy. This may effect a substantial improvement in the workability of steel and in its fatigue properties. By way of further example, by starting with proper quality materials, or by electron beam hearth purification, stainless steels may be produced which have a lower interstitial content, that is, low carbon and nitrogen content. It is generally known that such steels have improved corrosion resistance and are generally easier to fabricate at given tensile strengths than are similar stainless steels containing higher amounts of carbon and nitrogen. The improved fabricability achieved at low interstitial content is believed to result from the relative freedom from carbides and nitrides at the grain boundary.

It is also known that proper high vacuum electron beam purification of steel and some other materials, by suitably controlling the heat input and the throughput rate of the molten material, is capable of reducing volatile metallic impurities to extremely low levels. The result is an improved quality material, for example, in the case of ferritic stainless steels, lower transition temperatures for impact strength may be obtained.

As mentioned above, many types of vacuum refining processes are known in the art. Vacuum induction processing typically involves batch melting in a vacuum with the metal being contained in a melting crucible surrounded by an induction coil. The crucible is lined with a refractory material and the molten metal comes in contact with the refractory material in the crucible. Accordingly, vacuum induction processing may result in erosion of the refractory materials with the consequent necessity of periodic replacement, and also in possible contamination of the metal by refractories.

Another type of vacuum refining process which is not subject to the refractory erosion or contamination problem mentioned above is the so-called "vacuum arc remelt" process. In vacuum arc remelting, an electrical arc is established between molten material in a continuous casting mold, typically maintained at ground potential, and a solid feed stock bar or ingot of the material being purified, typically maintained at a high negative potential. The bar or ingot acts as a consumable electrode and is melted by the arc to drip molten material into the continuous casting mold, wherein the material is resolidified in a more purified form. Drip melting purification processes have also employed electron beams directed at the bar or ingot being remelted to cause the bar or ingot to drip melt into the continuous casting mold.

In U.S. Pat. No. 3,343,828, issued Sept. 26, 1967, and assigned to the assignee of the present invention, a vacuum refining or purifying furnace is described which employs electron beams as the heating source, and operates to flow the molten metal along a hearth in a high vacuum zone wherein volatile metallic impurities are drawn off. Under some circumstances, the high vacuum furnace shown and described in the aforementioned patent may encounter problems. For example, where the feed stock being melted in the initial melting region or zone is comprised of a gassy or otherwise impure material, considerable outgassing in the region may interfere with the operation of the electron beam gun. Moreover, it is possible that sufficient electron beam power levels to produce melting at a desirable rate may not be readily achievable by electron beam guns.

The aforementioned problems may be alleviated by providing an induction melting crucible in the melting region as taught by U.S. Pat. No. 3,658,119 issued Apr. 25, 1972, and assigned to the assignee of the present invention. In the aforementioned patent, a solid material charge is placed in the induction crucible and is melted therein. Once melting has been accomplished at the efficient power input of induction heating, with the consequent outgassing taking place, the molten material is poured down a hearth wherein it is purified by proper heating by electron beams. For certain materials, the high vacuum furnace described in the aforementioned patent application may not be entirely satisfactory. This is because crucible erosion, previously described, takes place in the refractory lining in an induction crucible, necessitating periodic replacement and resulting in possible contamination of the melt. Moreover, the induction melting process is of necessity a batch process, meaning that the continuity of the process must be periodically interrupted in order to replenish the feed stock. Furthermore, an induction furnace in the front end of a refining furnace is a different class of furnace from that of an electron beam vacuum furnace. Consequently, it may be difficult to obtain operating personnel well trained in the operation of both types of furnaces.

It is an object of the present invention to provide an improved vacuum refining furnace.

Another object of the invention is to provide an improved vacuum refining furnace in which the molten metal is always contained in skulled containers to avoid contamination and erosion of refractory materials.

It is another object of the invention to provide an improved vacuum refining furnace capable of continuous melting of feed stock.

Still another object of the invention is to provide a vacuum refining furnace in which the material is contained throughout in skulled containers and which is capable of efficient melting of gassy feed stock.

Other objects of the invention will become apparent to those skilled in the art from the following description taken in conjunction with the accompanying drawings wherein.

Generally, the invention involves the melting of solid metal in a first vacuum region by means of an electric arc. The molten metal is collected and passed, in skulled containing means, from the first vacuum region to and through a second vacuum region which has a substantially lower pressure than the first vacuum region. In the second vacuum region, the molten metal is heated by electron beams and undergoes purification. Subsequently, the molten metal is solidified in a third vacuum region.

Figure 1:
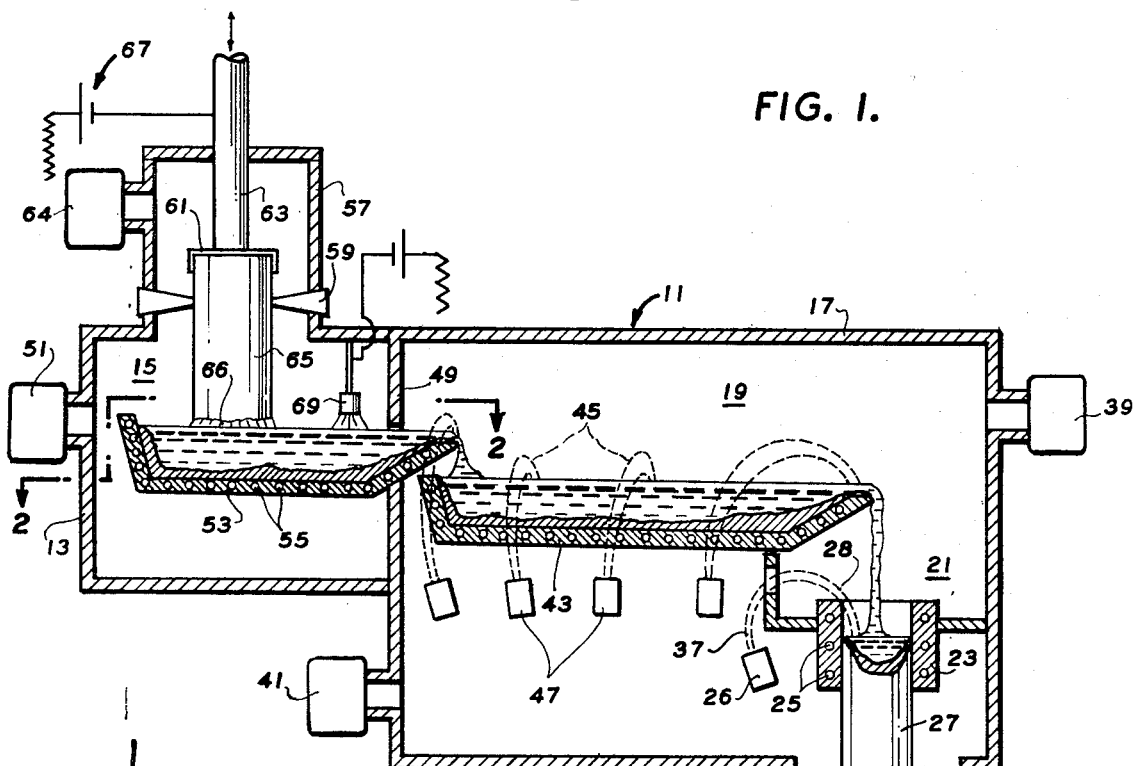
FIG. 1 is a schematic full section view of a vacuum refining furnace constructed in accordance with the invention.
Figure 2:
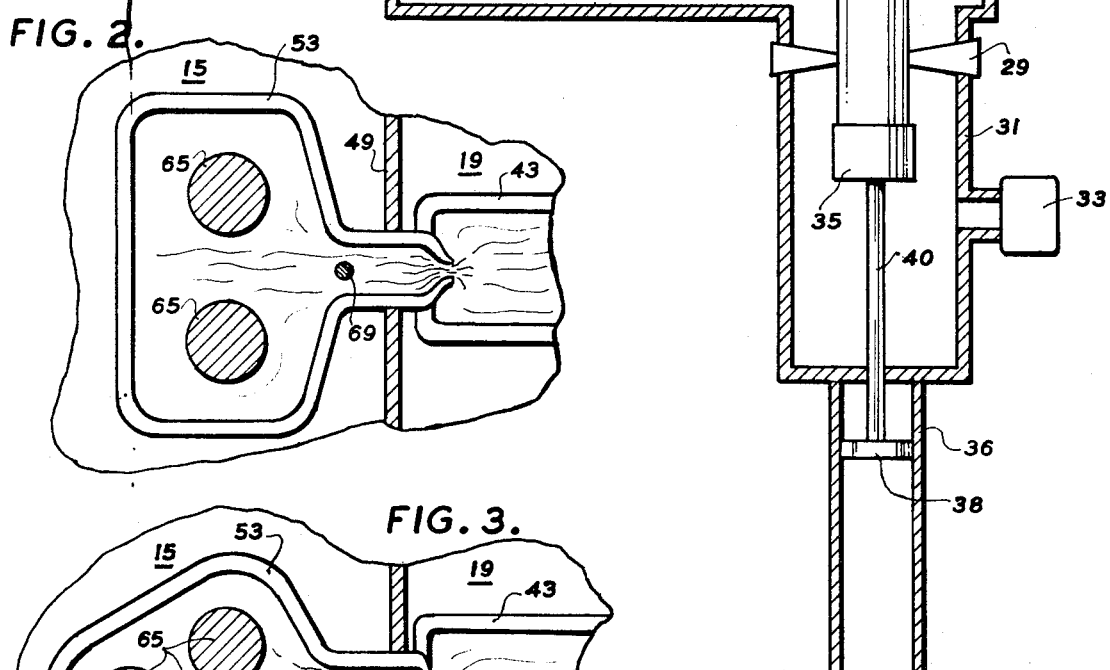
FIG. 2 is a sectional view of a portion of the furnace of FIG. 1, taken along the line 2—2 of FIG. 1.

The method of the invention may be best understood by reference to the detailed description of the vacuum furnace of the invention as follows. Referring more particularly to FIGS. 1 and 2, the vacuum furnace of the invention includes a housing 11 having a melting section 13 at one end defining a melting region or chamber 15. The housing 11 also includes a portion 17 defining both a purifying region or chamber 19 and a solidifying or casting region or chamber 21. The purifying region is contiguous with the casting region.

A continuous casting mold 23 is positioned in the casting region 21 for receiving molten metal therein and for continuously casting an ingot as is known in the art. The continuous casting mold 23 is provided with a plurality of coolant pasages 25 therein for cooling the ingot. Hot topping for the ingot is provided by a suitable electron beam gun 26, which produces an electron beam 28. The gun 26 is similar to the guns 47, described more fully below.

After passing through the continuous casting mold 23, the ingot 27 passes through an isolation valve 29 into an ingot can 31. The ingot can is separately pumped by a vacuum pump 33 and, during casting, the interior of the ingot can is maintained at a high vacuum. An ingot retractor 34 is provided in the ingot can 31 and a suitable hydraulic retracting cylinder 36 encloses a piston 38 connected to the retractor 35 by a piston rod 40. The retractor 35 withdraws the ingot 27 from the continuous casting mold 23 and into the ingot can 31. When casting is completed, and the ingot fully withdrawn into the ingot can, the isolation valve 29 is closed, and the ingot can is brought to atmosphere and the ingot removed therefrom.

Although only a single continuous casting mold 23 and ingot can 31 are shown, it is to be understood that a plurality of continuous casting molds may be provided in the casting region of the furnace, with suitable cooled skulled runners for selectively feeding molten metal thereto. In this way, molten metal may be diverted to alternate casting molds when the casting of one ingot is complete, so that casting may continue uninterrupted in that one ingot may be removed while another is being cast at the same time.

The section 17 of the housing 11 is divided by a pressure barrier 37. A vacuum pump 39 is provided for evacuating the region above the pressure barrier 37 and a vacuum pump 41 is provided for evacuating the region below the pressure barrier. An elongated water-cooled hearth 43 is provided on one side of the pressure barrier 37. Molten metal flows across the hearth 43 under high vacuum conditions to undergo purification. While flowing on the hearth 43, the metal is heated by a plurality of electron beams 45 produced by a plurality of electron beam guns 47. The electron beam guns 47 are located below the pressure barrier 37 and the hearth 43, and the beams are projected upwardly through openings in the pressure barrier 37 and are deflected by suitable deflecting means, not shown, to impinge upon the surface of the molten metal flowing along the hearth 43. Suitable electron beam gun systems for accomplishing this are known in the art and are available from Airco Temescal Division of Air Reduction Company, Berkeley, Calif.

By suitable exposure to vacuum and electron beam bombardment of the molten metal flowing across the hearth, soluble and insoluble volatile metallic impurities may be reduced to very low levels, resulting in superior quality of the final metal product. In addition, the interstitials, carbon and nitrogen, may also be reduced to levels sufficiently low so that all carbon and nitrogen in the alloy will be in solid solution at room temperature. This results in improved workability of the material. In this connection, good results may be obtained in a continuous process when a molten iron base alloy is passed over a cooled hearth disposed in a region evacuated to less than one micron at a rate of between about 100 and about 2,000 pounds per hour per square foot of hearth. The lower the pressure, the greater the flow rate that may be utilized. Preferably, the pressure in the region above the hearth is approximately 0.5 micron. For satisfactory electron gun operation, it is preferable that the pressure below the pressure barrier 37 be about 0.1 micron.

The melting region or chamber 15 is separated from the remaining regions within the housing 11 by means of a pressure barrier 49. The melting region or chamber 15 is evacuated by a vacuum pump 51. The molten metal which is melted within the region 15 is collected in a forehearth 53. In the embodiment of the invention illustrated in FIGS. 1 and 2, the forehearth 53 is of a generally T-shaped configuration, one portion of which is situated directly beneath the feed stock described below, and the other section of which projects to and through a suitable opening in the pressure barrier 49 to allow molten metal to flow into the hearth 43. The forehearth is provided with a plurality of passages 55 therein for cooling the forehearth and providing a skull of frozen or solidified material between the forehearth itself and the molten material.

A pair of charging locks 57, only one of which is illustrated in the drawings, are provided above the melting section 13 of the housing 11. The charging locks 57 are separated from the melting region 15 by suitable isolation valves 59. Each of the charging locks contains a mechanism for supporting and feeding a bar of feed stock 65 downwardly as it is consumed by the arc, described below. The feed stock supporting mechanism includes a clamp 61 for suitably securing to the feed stock itself and a drive rod 63. The drive rod 63 is capable of moving the clamp downwardly with consumption of the feed stock held in the clamp. A vacuum pump 64 is provided for each of the charging locks and use of the vacuum pump in connection with the isolation valves enables the charging locks to be brought up to atmosphere for placing new feed stock material therein. Thus, a new feed stock bar or stick 65 may be inserted in one of the charging locks in the clamp 61 therein while the other is being melted in the melting region 15. In this way, a continuous supply of molten metal may be provided to the forehearth 53 for flowing down the hearth.

The arc for melting the feed stock bars or sticks 65 is established in the region 66 by a suitable power supply 67 which provides a source of negative potential and very high current. Typical potential differences between the feed stock bar or stick 65 and the molten metal in the forehearth are about 40 volts, with approximately 50,000 amperes of current. Typical pressures within the melting region are between 10 and 100 microns.

As an alternative to consumable arc melting, a non-consumable electrode or electrodes may be provided for melting the feed stock bars or sticks 65. In either case, the capability of arc melting for operating at relatively high pressures eliminates difficulties in the case of gassy feed stock material, while at the same time allowing for completely skulled containers within the furnace to minimize contamination and maintenance problems. The presence of a non-consumable arc electrode within the melting zone enables the adidtion of chunks or particles of scrap material through one of the charging locks 57. Such material may be heaped upon the forehearth prior to melting.

In addition to the consumable electrode arc melting provided for in the illustrated drawing, a non-consumable arc electrode 69 is provided in the melting region 15. Non-consumable electrodes may be of any suitable known type and are capable of operating at the typically relatively high pressure levels within the melting region to maintain a molten condition in the melt as it flows across the forehearth onto the purifying hearth.

Figure 3:
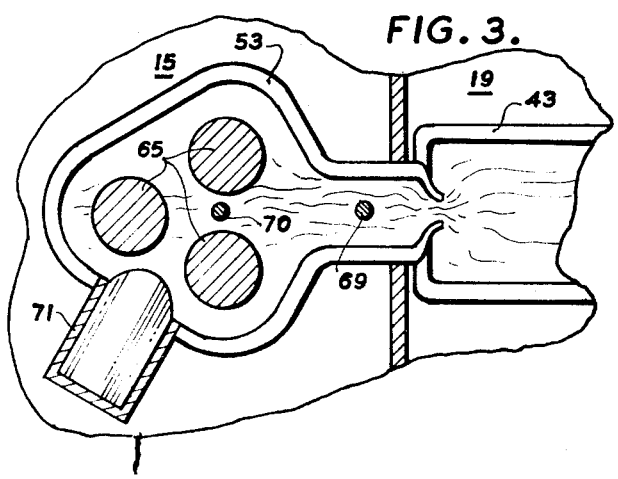
FIG. 3 is a view similar to FIG. 2 illustrating a modification of that portion of the furnace shown in FIG. 2.

Referring now to FIG. 3, an alternative embodiment of the invention is shown. In this embodiment a three-stick configuration is shown, with the shape of the forehearth being varied accordingly to include the area under all three sticks. In addition, provision is made for non-consumable arc melting of the feed sticks by a non-consumable electrode 70, as well as a side charging lock 71 for charging the forehearth with particulate material. This particular configuration affords a wide variety of means for handling various charge materials.

Significant advantages are provided by the method and apparatus of the invention. The entire molten metal handling system is skulled, either by providing water-cooled copper containers or water-cooled ceramic lined containers. In either case, very low maintenance costs result because there is little or no wear of ceramic materials. Rapid shut-down and start-up without having to maintain a molten metal inventory in the containers is possible, and thus it is possible to bring the interior of the furnace up to atmospheric pressure without resultant nitrogen contamination of charge materials therein. Moreover, training of operating and maintenance personnel is more simple compared to systems involving skulled and non-skulled types of operation. Continuous processing of molten material down the hearth is possible because of the plurality of charging locks and ingot casting stations. The use of a three-feed-stick operation, as described in FIG. 3, offers a possible 100% increase in productivity over the system shown in FIGS. 1 and 2.

It may therefore be seen that the invention provides an improved vacuum refining furnace using all skulled transfer structures and which is capable of continuous melting of feed stock. Problems created by outgassing of feed stock during melting are handled efficiently and easily without deleteriously affecting the process.

Various modifications of the invention in addition to those shown and described herein will become apparent to those skilled in the art from the foregoing description and accompanying drawings. Such modifications are intended to fall within the scope of the appended claims.

What is claimed is:

1. A method for purifying metal comprising, melting solid metal in a first vacuum region by means of an electric arc established between the solid metal and the molten metal in said containing means, collecting the molten metal and passing the molten metal in skulled containing means from the first vacuum region to and through a second vacuum region having a substantially lower pressure than the first vacuum region, heating the molten metal in the second vacuum region by means of electron beams, and solidifying the molten metal in a third vacuum region.

2. A method according to claim 1 wherein the pressure in said first vacuum region is between 10 and 100 microns, and wherein the pressure in said second region is less than 1 micron.

3. A vacuum furnace for purifying metal comprising, a melting region, a purifying region for receiving metal from said melting region, a solidifying region for receiving metal from said purifying region, electron beam heating means in said purifying and solidifying regions for heating molten metal therein, cooled containing means in said melting, purifying and solidifying regions for containing the molten metal in a solidified skull and for causing the molten metal to flow from said melting region through said purifying region to said solidifying region, means for maintaining a pressure differential between said purifying region and said melting region, means for supporting solid metal feed stock in said melting region above said containing means therein, and means for establishing a potential between feed stock and the molten metal in said containing means to produce an arc with the feed stock comprising a consumable electrode to melt the feed stock into said containing means.

4. A vacuum furnace according to claim 3 wherein said supporting means comprise a plurality of support devices, each for supporting a bar of metal feed stock, and wherein said arc producing means are adapted for selectively melting said bars of feed stock into said containing means.

5. A vacuum furnace according to claim 4 wherein said containing means in said melting region are shaped to receive molten metal from the feed stock supported by any of said support devices.

6. A vacuum furnace according to claim 3 wherein said containing means include a forehearth in said melting region, and means for cooling said forehearth.

7. A vacuum furnace according to claim 4 including a vacuum lock for each of said support devices, and means for selectively bringing said vacuum locks to atmospheric pressure for recharging said support device therein while another of said support devices is supporting a bar of metal feed stock being melted.

References Cited

UNITED STATES PATENTS

| | | | |
|---|---|---|---|
| 3,342,250 | 9/1967 | Treppschuh | 75—49 |
| 3,615,345 | 10/1971 | King | 75—10 |
| 3,635,696 | 1/1972 | Finkl | 75—49 |

OTHER REFERENCES

Journal of Metals, pp. 51–54 (January 1961): P. Taylor, "Plasma for Extractive Metallurgy."

Chemical & Engineering News, p. 70 (October 22, 1962): "Linde Adapts Plasma Arc to New Furnace."

Welding Journal, pp. 870–875 (September 1959): "Plasma—A Substitute for the Oxy-Fuel Flame."

L. DEWAYNE RUTLEDGE, Primary Examiner

P. D. ROSENBERG, Assistant Examiner

U.S. Cl. X.R.

13—9; 75—11, 12, 49; 266—34